United States Patent
Malinowski, Jr. et al.

[11] Patent Number: 6,027,139
[45] Date of Patent: Feb. 22, 2000

[54] BALLAST CONTAINER FOR TRUCK BEDS

[76] Inventors: Robert L. Malinowski, Jr.; Marsha W. Malinowski, both of 28473 Wick Rd., Romulus, Mich. 48174

[21] Appl. No.: 09/149,349

[22] Filed: Sep. 8, 1998

[51] Int. Cl.[7] ............................................. B60S 9/00
[52] U.S. Cl. ............................................. 280/759
[58] Field of Search .................................. 280/757, 759

[56] References Cited

U.S. PATENT DOCUMENTS

| | | | |
|---|---|---|---|
| 2,993,721 | 7/1961 | Bowman | 293/69 |
| 3,614,135 | 10/1971 | Eid | 280/491 E |
| 3,727,971 | 4/1973 | Sisler | 280/759 |
| 4,339,142 | 7/1982 | Tanner et al. | 280/759 |
| 4,688,823 | 8/1987 | Hanses | 280/759 |
| 4,796,914 | 1/1989 | Raynor | 280/757 |
| 5,080,418 | 1/1992 | Semple et al. | 280/757 |
| 5,172,953 | 12/1992 | Chamberlain | 296/39.2 |
| 5,657,916 | 8/1997 | Tackett | 280/757 |

*Primary Examiner*—Kenneth R. Rice
*Attorney, Agent, or Firm*—Henderson & Sturm

[57] ABSTRACT

A ballast system comprising an I-beam shaped molded member having a hollow inner chamber accessible through a fill cap and drain plug and including a molded contoured bottom section molded to fit into the recesses formed into the upper surface of the ballast member. The recesses formed into the upper surface serve as storage spaces for tools and supplies.

5 Claims, 1 Drawing Sheet

# BALLAST CONTAINER FOR TRUCK BEDS

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of vehicle accessories, and more particularly to a ballast container for truck beds.

2. Description of Related Art

As can be seen by reference to the following U.S. Pat. Nos. 5,172,953; 4,796,914; 4,688,823; 4,339,142; 3,614,135; and 2,993,721 the prior art is replete with myriad and diverse ballast systems for trucks and tractors.

While all of the aforementioned prior art constructions are more than adequate for the basic purpose and function for which they have been specifically designed, they are uniformly deficient with respect to their failure to provide a simple, efficient, and practical ballast container for a truck bed.

As a consequence of the foregoing situation, there has existed a longstanding need for a new and improved ballast container for a truck bed and the provision of such a construction is a stated objective of the present invention.

BRIEF SUMMARY OF THE INVENTION

Briefly stated, the present invention provides a ballast system comprising an I-beam shaped molded member having a hollow inner chamber accessible through a fill cap and drain plug and including a molded contoured bottom section molded to fit into the recesses formed into the upper surface of the ballast member. The recesses formed into the upper surface serve as storage spaces for tools and supplies.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
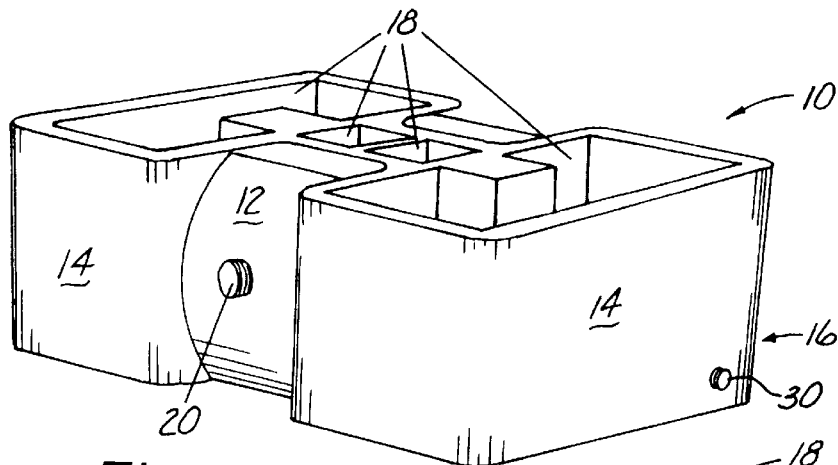
FIG. 1 is a perspective view of the ballast container of the present invention.
Figure 2:
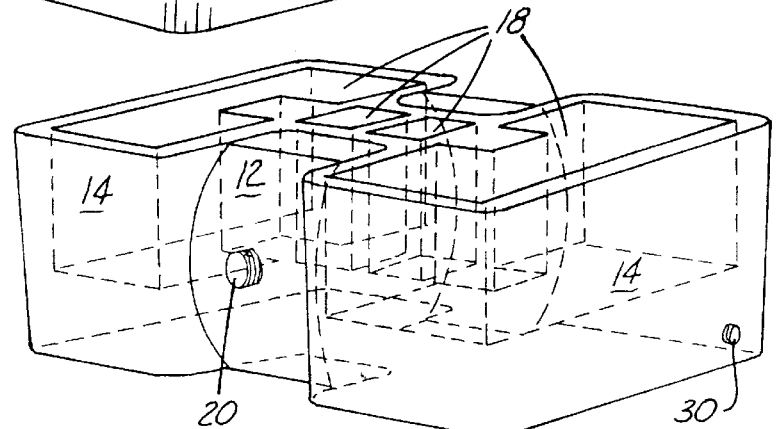
FIG. 2 is a perspective view similar to FIG. 1, but showing interior detail in dashed lines.
Figure 3:
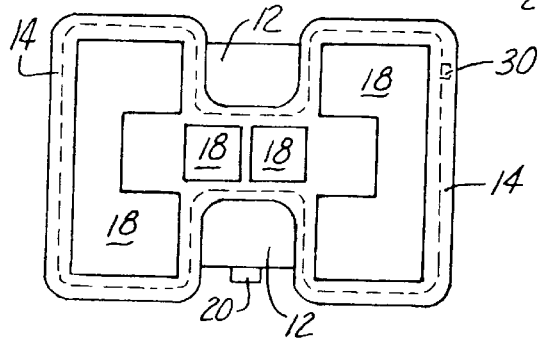
FIG. 3 is a top plan view of the ballast container.
Figure 5:
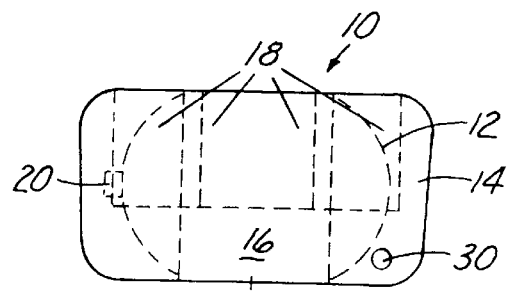
FIG. 5 is a side elevational view thereof.
Figure 4:
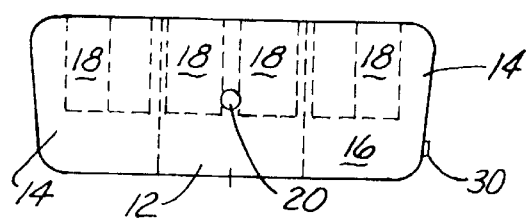
FIG. 4 is a front elevational view thereof.

As can be seen by reference to the drawings, and in particularly to FIG. 1, the ballast container that forms the basis of the present invention is designated generally by the reference number 10.

The ballast container 10 is made from high-impact plastic, and resembles an I-beam in shape. One midsection 12 of the I-beam features a fill hole 20 with a removable threaded cap, while a smaller drain plug 30 is placed at the corner of one side section 14. The lower section 16 thus forms a tank for holding a quantity of ballast material. The top of the device is hollow, and divided into storage sections 18 and a latchable cover (not shown) may be provided. The top and bottom lips of each ballast container 10 are designed to be stackable, allowing a user to add multiple ballast containers 10 to their truck bed as desired. Dimensions for the ballast container 10 vary according to truck bed size, but would be large enough to fit into the bed from side to side, with a cut out on each side allowing the ballast container 10 to straddle the truck's wheel wells. In a full-size truck application, the dimensions would measure approximately 17" in height, 70" in width, and 48" in length, allowing it to contain approximately 60 gallons of liquid weighing around 500 pounds.

In use, a user inserts the ballast container 10 into their truck bed between the wheel wells. Next, they fill the ballast container tank 16 with sand, an anti-freeze/water mixture, etc. Finally, the user may store tools or other small items into the storage areas 18 across the top of the device. Use of the ballast container 10 provides a convenient and easy to use method of increasing a pickup truck traction in snow, ice, or any slippery driving condition, while providing an inner-bed storage area 18.

The concept of the ballast container 10 is that of a filled tank 16 and tool storage area 18 designed to mount between the wheel wells of a pickup truck bed. The weight of the ballast container 10 may be increased or decreased as needed, while the top compartments 18 of the device may be used to store handyman's tools or other items.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

We claim:

1. A ballast system for a truck bed, comprising:

a container including a lower hollow chamber, a fill port and drain port both in communication with the hollow chamber, and an upper storage section disposed above the hollow chamber.

2. The ballast system of claim 1, wherein the upper storage chamber includes a plurality of individual compartments.

3. The ballast system of claim 1, wherein the container is integrally formed.

4. The ballast system of claim 3, wherein the container is formed in the shape of an I-beam including a narrow midsection.

5. The ballast system of claim 4, wherein the midsection is disposed adjacent opposing wheel wells of the truck bed.

* * * * *